Oct. 30, 1928.
J. R. REPLOGLE
1,689,933
REFRIGERATED FOOD CABINET
Original Filed Nov. 9, 1923
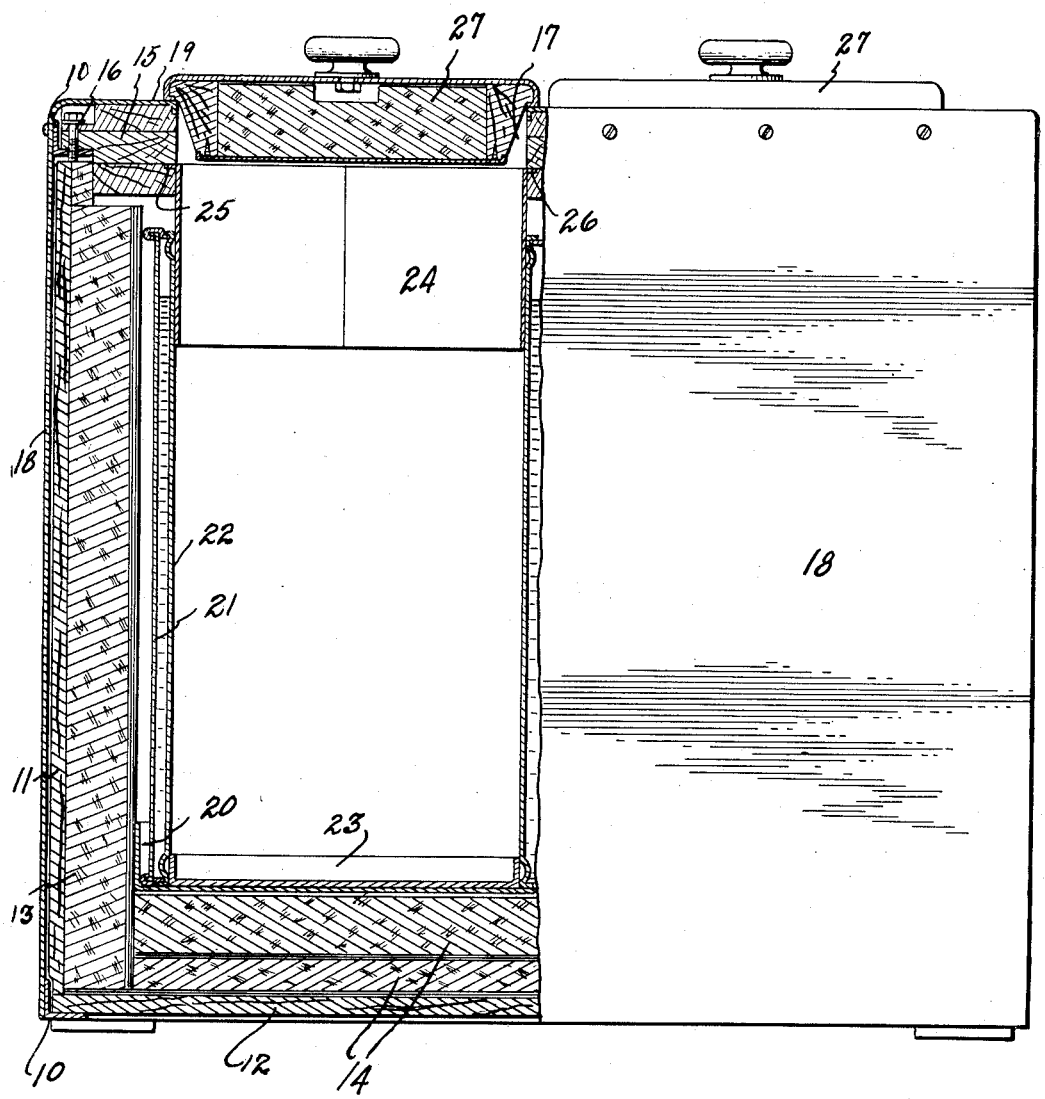
INVENTOR.
BY John R. Replogle
Wayne M. Hart.
ATTORNEY.

Patented Oct. 30, 1928.

1,689,933

UNITED STATES PATENT OFFICE.

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

REFRIGERATED FOOD CABINET.

Original application filed November 9, 1923, Serial No. 673,678, and in Canada August 30, 1923. Divided and this application filed August 26, 1926. Serial No. 131,593.

This invention relates to refrigerated cabinets for food and the like, and particularly to a form of food cabinet having a brine tank with one or more food chambers disposed therein so as to be surrounded and cooled by the brine, the present application being a division of my co-pending application, Serial No. 673,678, filed November 9, 1923.

An object of this invention is to provide walls between the food chambers in a brine tank and the openings in the top wall of a refrigerated food cabinet, so that food containers can be readily inserted and removed from the food chambers and without distorting or breaking the walls of the tank.

A further object of the invention is to provide a refrigerated cabinet in which a wall extends from the open end of a food container and is secured in the opening in the cabinet top so that the passage of warm air interiorly of the cabinet exterior of the food chamber is prohibited.

Other objects of the invention, more or less incidental are ancillary to the foregoing, will appear in the following description which sets forth, in connection with the accompanying drawing, a preferred embodiment of the invention.

The drawing illustrates a side elevation of a refrigerated food cabinet which is partially in section to illustrate my invention incorporated therewith.

Referring in detail to the construction illustrated, 10 represents angle irons which form the side sills of a main frame for a cabinet. The spaces intermediate the sills 10 at the sides of the frame are enclosed by a board wall, as shown at 11, and a bottom board wall 12 extends intermediate and rests upon the bottom angle irons forming the main frame. An insulating wall 13 is provided adjacent the interior of each of the side walls of the casing, and a pair of superposed layers of insulating material 14 are arranged to rest upon the bottom wall 12 of the casing. The top wall 15 of the casing is composed of a plurality of superposed wooden members 15, which rest upon the top angle irons 10 and are secured therewith by bolts 16. The top wall is provided with a plurality of openings which extend therethrough to provide passages through which access may be had to food chambers interiorly of the casing. The side and top walls of the casing are enclosed by a sheet metal cover 18, the top portion of the metal cover being cut out to align with the openings 17 and has edges 19 bent downwardly adjacent each opening.

A sheet metal pan 20, of substantially the same size as the space between the insulated walls interiorly of the cabinet, rests upon the upper layer of the bottom insulating material 14 and receives the sheet metal brine tank 21. The brine tank 21 includes a plurality of vertically extending annular sleeves 22, which are open at their upper ends and form food chambers. The brine tank rests upon the pan 20, and the sleeves are open at both ends and substantially surrounded by the brine within the tank. Annular plates 23 are inserted through the sleeves 22 and rest directly upon the pan 20, such pans forming the support for food inserted within the sleeves, and in this manner the weight of the food in the sleeves will rest upon the pan 20 and the joints of the tank will therefore receive no weight.

It is common practice to form the tank shorter in height than the vertical interior space within the cabinet, and unless containers, such as ice cream cans and the like, are carefully inserted into the sleeves 22, serious damage will be done to the top wall of the tank. Containers for carrying ice cream and other foods are of a rigid, heavy construction, while the walls of the tank are generally formed of thin copper, and if the containers are dropped against the tank the joints are very apt to become separated and the top wall to become distorted so that there will be leakage of the brine, or to become distorted so that the openings at the top of the sleeves will be inaccessible for the insertion of cans. In order to overcome this difficulty and also to permit the food containers to be readily positioned within the sleeves or food chambers, and to seal the space between the open tops of the sleeves and the top walls 15 of the cabinet casing, I provide sleeves 24 which are preferably formed of a single sheet of cuprous material which is of a size such that it will form an annular structure equal in diameter to the food sleeves when assembled within the cabinet. The upper surface of the bottom layer of the wall 15 is provided with a groove 25 which extends inwardly from the opening, and the upper end 26 of the sleeve is bent outwardly to form a flange which fits within the groove 25. The sheet of material forming the sleeves 24 can be rolled to a smaller diameter than the openings 17 in the top of the casing so that they can be inserted through the openings and permitted to expand, so that the flanges 26 will extend into the groove 25. The sleeves 24 are of sufficient width so that their bottom edges extend a considerable distance into the upper open ends of the sleeves 22. Ordinarily the flanges 26' will prevent displacement of the sleeves 24 when they are assembled within the cabinet but suitable pins can be inserted through the sleeves to engage the bottom layer of the top wall 15 of the casing, if desired.

It will be seen that the sleeves 24 enclose the space intermediate the top wall 15 of the casing and the top wall of the tank, and that they provide a guide which will direct food containers inwardly of the food chambers without contacting with the sleeves 22 until they are inserted a substantial distance within the casing. The sleeves also provide closures between the top of the brine tank and the top wall of the casing 15 to prevent the warm air from circulating exteriorly of the brine tank when a lid is removed.

Suitable removable lids 27 are provided to close the upper end of the openings 17. Suitable means can be provided interiorly of the tank for cooling the brine, such as may be seen in my above mentioned co-pending application.

Various changes can be made in the detail structure described without departing from the spirit of my invention and the scope of the appended claims.

What I claim is:

1. In a refrigerated food cabinet, the combination of a heat insulated chamber having an apertured top wall formed of material of low heat conductivity, a brine tank within said chamber having open food storage compartments in alignment with the apertures through said top wall, and annular sleeves having a flanged end adapted to be embedded in said top wall adjacent the apertures intermediate the upper and lower surfaces thereof, said sleeves depending into the food storage compartments to form a continuous enclosed passageway.

2. In a refrigerated food cabinet, the combination of a thermally insulated chamber having an apertured top wall formed of laminations of material of low heat conductivity, a brine tank within said chamber having open food storage compartments in alignment with the apertures through said top wall, and metallic sleeves having a flanged end adapted to be held between the laminations of said top wall and extending into said compartments, said sleeves forming an unobstructed guide for the insertion of food containers into said food storage compartments.

3. In a refrigerated food cabinet, the combination of a heat insulated chamber having an apertured top wall formed of material of low heat conductivity, a brine tank in said chamber having open food storage compartments in vertical alignment with the apertures through said top wall, and annularly resilient metallic sleeves extending from said apertures into said compartments, said sleeves being removable from said apertures when contracted.

4. In a refrigerated food cabinet, a brine tank having food storage compartments therein, a top wall disposed in spaced relation above said brine tank and composed of heat insulating material having a superposed metallic top member and provided with openings therethrough disposed in alignment with the said food storage compartments, and sleeve members having one end disposed within the food compartment and the other end secured to the wall of the opening in the top wall in spaced relation with said metallic top member.

5. In a refrigerated food cabinet, the combination of a heat insulated chamber having an apertured top wall formed of material of low heat conductivity, a brine tank in said chamber having open food storage compartments in alignment with the apertures through said top wall, and annular metallic sleeves extending from said apertures into said compartments, said sleeves being split longitudinally and circumferentially compressible to permit removal thereof from the cabinet.

In testimony whereof, I hereunto affix my signature.

JOHN R. REPLOGLE.